United States Patent [19]

Krause

[11] Patent Number: 4,838,372

[45] Date of Patent: Jun. 13, 1989

[54] LOAD CELL

[75] Inventor: Matthias R. Krause, Hamburg, Fed. Rep. of Germany

[73] Assignee: U.S. Philips Corporation, New York, N.Y.

[21] Appl. No.: 235,855

[22] Filed: Aug. 24, 1988

[30] Foreign Application Priority Data

Sep. 12, 1987 [DE] Fed. Rep. of Germany ....... 3730703

[51] Int. Cl.⁴ .......................... G01G 3/14; G01L 1/22
[52] U.S. Cl. .................................. 177/211; 73/862.65
[58] Field of Search ....................................... 177/211; 73/862.65–862.67

[56] References Cited

U.S. PATENT DOCUMENTS

| | | | |
|---|---|---|---|
| 3,376,537 | 4/1968 | Pugnaire | 177/211 X |
| 4,148,219 | 4/1979 | Golding et al. | 73/862.65 |
| 4,589,291 | 5/1986 | Sander | 73/862.65 |
| 4,733,571 | 3/1988 | Ormond | 73/862.65 |

FOREIGN PATENT DOCUMENTS 58-9033  1/1983  Japan ................. 73/862.65

Primary Examiner—George H. Miller, Jr.

[57] ABSTRACT

In a load cell, in particular for weighing systems, comprising a deformable member (1), this deformable member has at least one aperture (2) which extends transversely of the direction of the force, to which at least one disc-shaped support (3, 6), which corresponds to the cross-section of the aperture and extends transversely of the axis of the aperture is welded, the support being provided with strain gauges (4, 7) deposited by means of a film technique. The support, which is welded to the outer edge of the aperture, completely closes the aperture and supports the strain gauges at its interior side.

4 Claims, 1 Drawing Sheet

LOAD CELL

The invention relates to a load cell, in particular for weighing systems, comprising a deformable member which has at least one aperture extending transversely of the direction of the force, to which at least one disc-shaped support which corresponds to the cross-section of the aperture and extends transversely of the axis of the aperture is welded, strain gauges being deposited on this support by means of a film technique.

Such a load cell for weighing systems is disclosed in the EP-PS No. 0 105 564. The prior art load cell has a cylindrical deformable member in the form of a compressively loaded member, in which a through-bore is provided transversely of the direction of force. A disc-shaped support which extends transversely of the axis of the bore is centrically welded in this bore. Strain gauges are deposited on the support by means of a film technique. When a force acts in the direction transversely of the bore, the support is compressed in the direction of the applied force and is expanded in a direction perpendicular to the force. This compression and expansion, respectively, causes the resistance of the strain gauges to change. Placing the disc-shaped support in a central position in the bore is complicated as the welding spot within the bore is difficult to access. As the strain gauges which are deposited in film technique are sensitive to moisture, they must be protected from corrosion by covering them.

It is an object of the invention to provide a load cell which renders easy mounting of the support to the aperture possible and whose strain gauges are protected from corrosion without the need for further covering.

According to the invention, this object is accomplished with a load cell of the type defined in the opening paragraph in that at least one support is welded to the outer edge of the aperture, which fully covers the aperture and is provided on its interior side with the strain gauges.

The load cell according to the invention may have a through-hole which is fully closed by two supports which are welded to the two outer edges. The supports can easily be provided at the outer edge. The aperture may alternatively be in the form of a blind hole. The cross-section of such a hole may be square, rectangular or circular. Since the strain gauges are provided at the interior side of the support, i.e. at the side of the support pointing towards the aperture, a corrosive substance cannot affect the strain gauges. The deformable member can be both a compressively loaded member or a shearing member (to take up shearing forces). A compressively loaded member can be constituted by, for example, a cube-shaped member or a cylindrical member. When the member is cylindrical, the outer edge of the aperture at the exterior face of the member must be of such a shape that the edge curve of the aperture extends in a plane.

An easily produceable load cell is obtained when the aperture is a circle cylindrical through-bore which is closed by two supports welded to the outer edge of the bore.

For load cells for heavy loads it is often a requirement that the cross-section of the through-bore is reduced. To obtain such a cross-section for the bore, it is provided that two facing apertures in the form of blind holes are closed by supports which are welded to the outer edge of the bore. A partition is provided between the blind holes in the deformable member. This partition has for its object to reinforce the load cell when heavy loads are to be measured.

An advantageous embodiment of the invention is obtained when the support for the strain gauges and the deformable member are made of the same material. This achieves that no measuring error occurs at a change in temperature. Since the support and the deformable member are made of the same material they evidently have also the same coefficients of expansion.

Embodiments of the invention will now be described in greater detail with reference to the accompanying drawing. Therein:

Figure 1:
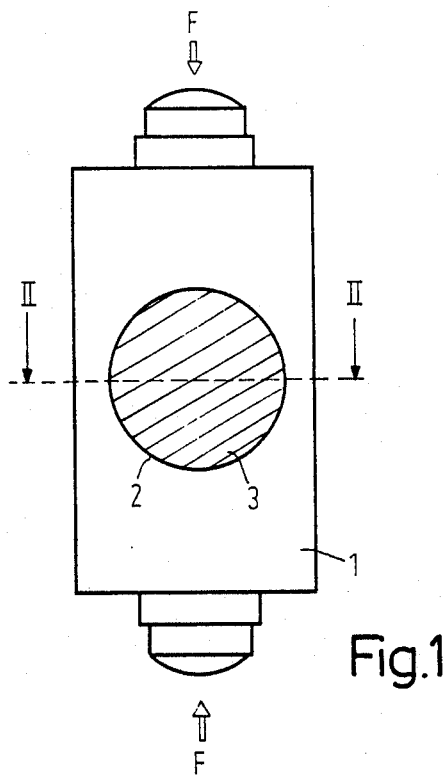
FIG. 1 is a side elevation of a compressively loaded member of a rectangular cross-section.
Figure 2:
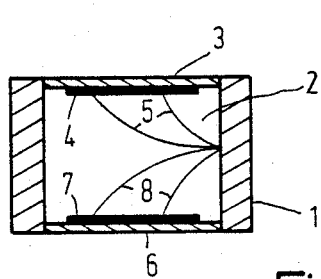
FIG. 2 is a sectional view of a compressively loaded member in accordance with FIG. 1 having a through-aperture, taken on the plane II—II.

FIG. 1 shows a load cell for a weighing system, having a compressively loaded member 1. The compressively loaded member 1 has an aperture 2 which is provided transversely of the longitudinal axis and is in the form of a circle cylindrical through-bore, as is shown in FIG. 2. The aperture 2 is closed by welding at both ends by a disc-shaped, metallic support 3 and 6, respectively. The surfaces of the supports 3 and 6 are basically equal to the cross-section of the through-bore 2. The welded joint connecting the disc-shaped supports 3 and 6 to an edge of the through-bore extends along the overall periphery of the supports 3 and 6. Welding must here be understood to mean an inseparable connection which is preferably made by fusion of the materials or by alloying at the connecting parts. The supports 3 and 6 can be connected to the compressively loaded member 1 by microplasma welding, laser welding, electron beam welding or by hard soldering. The interior side of the supports 3 and 6 are provided with strain gauges 4 and 7, respectively, which are deposited by means of a thin-film technique, i.e. by vacuum deposition or by sputtering. They may alternatively be provided on the support by means of a thick-film technique, the compressively loaded members then being printed and baked as a resistance paste on the supports 3 and 6 in a screen printing method. The strain gauges 4 and 7 are further connected to leads 5 and 8 which are fed out to the exterior through a channel in the compressively loaded member 1.

Figure 3:
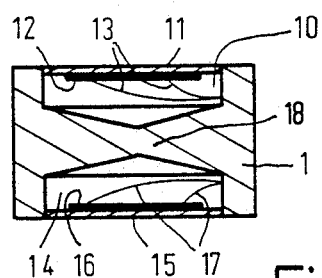
FIG. 3 is a cross-sectional view of a compressively loaded member in accordance with FIG. 1 having two facing blind holes, taken on the plane II—II.

When a force F acts on the compressively loaded member 1, this member is compressed in the direction of the force F and bulges outwardly perpendicularly thereto. The changing shape of the compressively loaded member 1 results in the supports 3 and 6 being compressed in a direction perpendicularly to the force F. The compression of the supports 3 and 6 reduces the resistance of those parts of the strain gauges 4 and 7, which extend perpendicularly to the direction of the force; the expansion of the supports 3 and 6 increases the resistance of those parts of the strain gauges 4 and 7, which extend perpendicularly to the direction of the force F. By means of an evaluation circuit, not shown, the change in resistance of the strain gauges 4 and 7 is converted into an electric measuring signal which is proportional to the force F. The aperture of FIG. 1 may alternatively be a blind bore. As is shown in FIG. 3, the blind bore is also closed by a support 11, which at its interior side is provided with strain gauges 12, by means of welding. The strain gauges 12 are connected to leads 13. Opposite the blind bore 10 there is a further blind bore 14 which is closed by a support 15. The support 15 is also provided at its interior side with strain gauges 16, to which leads 17 are connected. The two facing blind holes 10 and 14 are separated by a partition 18 in the compressively loaded member 1, so that the embodiment shown in FIG. 3 can be used in higher load ranges than the embodiment shown in FIG. 2.

Figure 4:
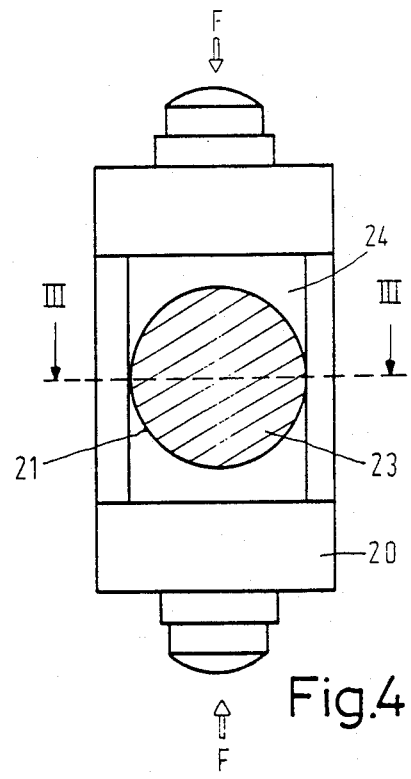
FIG. 4 is a side elevation of a compressively loaded member of a circular cross-section.
Figure 5:
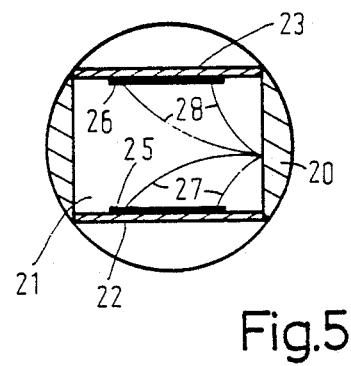
FIG. 5 is a cross-sectional view of the compressively loaded member of FIG. 4, taken on the plane III—III.

A further embodiment of a load cell having a cylindrical compressively loaded member 20 is shown in the FIGS. 4 and 5. This cylindrical compressively loaded member 20 has a circle cylindrical through-bore 21, which is closed by supports 22 and 23 welded to the exterior sides of the through-bore. At each end of the circle cylindrical through-bore 21 the compressively loaded member 20, which inherently is cylindrical has flattened portions 24 which cause the edge curve at each end of the through-bore to extend in a plane. The interior sides of the two disc-shaped supports 22 and 23 are both provided with strain gauges 25 and 26, to which leads 27 and 28 are connected.

So as to obtain equal coefficients of expansion for the support and the compressively loaded member of such a load cell, the supports and the compressively loaded members must be made of the same material, preferably metal.

What is claimed is:

1. A load cell, in particular for weighing systems, comprising a deformable member which has at least one aperture extending transversely of the direction of the force, to which at least one disc-shaped support which corresponds to the cross-section of the aperture and extends transversely of the axis of the aperture is welded, strain gauges being deposited on this support by means of a film technique, characterized in that at least one support (3,6; 11,15; 22,23) is welded to the outer edge of the aperture (2; 10,14; 21) which fully covers the aperture and is provided on its interior side with the strain gauges (4,7; 12,16; 25,26).

2. A load cell as claimed in claim 1, characterized in that the aperture is a circle cylindrical through-bore (2; 21) which is closed by two supports (3, 6; 22,23) welded to the outer edge of the bore.

3. A load cell as claimed in claim 1, characterized in that two facing apertures in the form of blind bores (10, 14) are both closed by supports (11, 15) which are welded to the outer edge of the bore.

4. A load cell as claimed in anyone of the preceding claims, characterized in that the support for the strain gauges and the deformable member are made of the same material.

* * * * *